(12) United States Patent
Strickland et al.

(10) Patent No.: US 11,591,961 B1
(45) Date of Patent: Feb. 28, 2023

(54) JET ENGINE SCREEN ASSEMBLY

(71) Applicants: Cedric Strickland, Lithonia, GA (US);
Stanley Gilley, Lithonia, GA (US)

(72) Inventors: Cedric Strickland, Lithonia, GA (US);
Stanley Gilley, Lithonia, GA (US)

(*) Notice: Subject to any disclaimer, the term of this patent is extended or adjusted under 35 U.S.C. 154(b) by 0 days.

(21) Appl. No.: 17/529,349

(22) Filed: Nov. 18, 2021

(51) Int. Cl.
F02C 7/055 (2006.01)

(52) U.S. Cl.
CPC .................. F02C 7/055 (2013.01)

(58) Field of Classification Search
CPC . F02C 7/047; F02C 7/05; F02C 7/055; B64D 2033/022
See application file for complete search history.

(56) References Cited

U.S. PATENT DOCUMENTS

| 3,196,598 | A | 7/1965 | Olson |
| 3,871,844 | A | 3/1975 | Calvin, Sr. |
| 4,149,689 | A | 4/1979 | McDonald |
| D433,029 | S | 10/2000 | Eidson |
| D614,560 | S | 4/2010 | Alexander |
| 7,803,204 | B1 * | 9/2010 | Mladinich ............... F02C 7/055 55/306 |
| 8,052,083 | B1 | 11/2011 | Moran |
| 8,117,820 | B1 | 2/2012 | Briscoe |
| 2011/0011055 | A1 | 1/2011 | Troy |
| 2017/0334571 | A1 * | 11/2017 | Bai ........................ B64D 33/02 |

FOREIGN PATENT DOCUMENTS

| GB | 2339242 | 1/2000 | |
| KR | 101678319 B1 * | 11/2016 | ............. B64D 33/02 |

* cited by examiner

Primary Examiner — Steven M Sutherland

(57) ABSTRACT

A jet engine screen assembly for protecting a jet engine from debris includes a mounting ring which forms a closed loop thereby facilitating the mounting ring to be mounted to an intake of a jet engine. A grate is hingedly disposed on the mounting ring. The grate is comprised of a plurality of intersecting members that are arranged to define a plurality of holes to facilitate air to pass through the grate. The grate is comprised of a rigid material to inhibit debris from entering into the jet engine. The grate is positionable in a closed position has the grate covering the intake of the jet engine. Conversely, the grate is positionable in an open position having the grate being displaced from the intake of the jet engine.

7 Claims, 5 Drawing Sheets

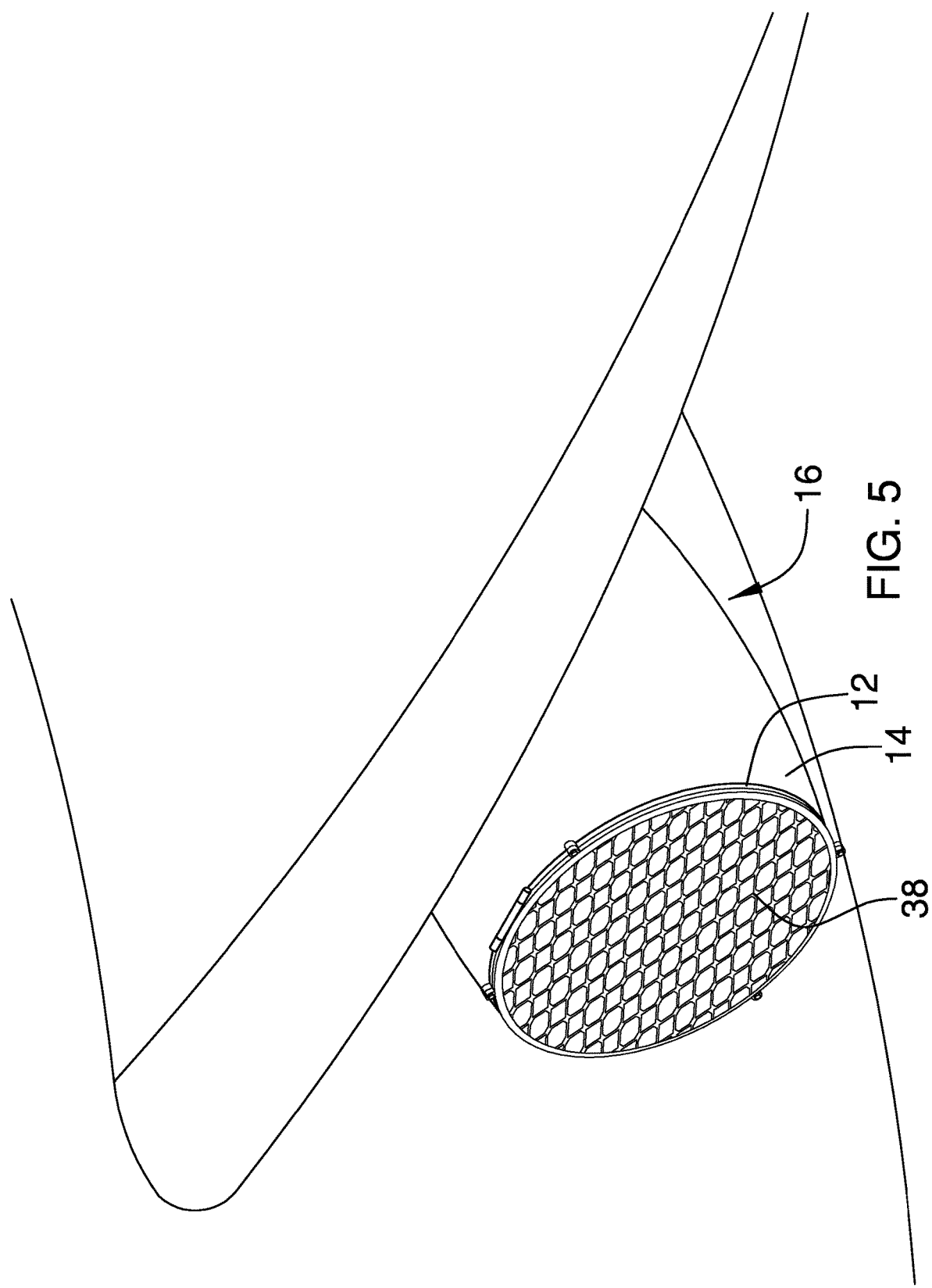

JET ENGINE SCREEN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to screen devices and more particularly pertains to a new screen device for protecting a jet engine from debris. The device includes a mounting ring that is mounted to a leading edge of an intake of a jet engine. A grate is hingedly disposed on the mounting ring. The grate is positionable in a closed position to inhibit debris from entering the jet engine. Conversely, the grate is positionable in an open position to facilitate access to the jet engine for servicing the jet engine.

(2) Description of Related Art Including Information Disclosed Under 37 CFR 1.97 and 1.98

The prior art relates to screen devices including a variety of conical screen deflectors that are mounted to an intake of a jet engine to protect the jet engine from debris. In no instance does the prior art disclose a grate that is hingedly disposed on an intake of a jet engine for protecting the jet engine from debris.

BRIEF SUMMARY OF THE INVENTION

An embodiment of the disclosure meets the needs presented above by generally comprising a mounting ring which forms a closed loop thereby facilitating the mounting ring to be mounted to an intake of a jet engine. A grate is hingedly disposed on the mounting ring. The grate is comprised of a plurality of intersecting members that are arranged to define a plurality of holes to facilitate air to pass through the grate. The grate is comprised of a rigid material to inhibit debris from entering into the jet engine. The grate is positionable in a closed position has the grate covering the intake of the jet engine. Conversely, the grate is positionable in an open position having the grate being displaced from the intake of the jet engine.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a perspective in-use view of an embodiment of the disclosure showing a grate in a closed position.

DETAILED DESCRIPTION OF THE INVENTION

Figure 1:
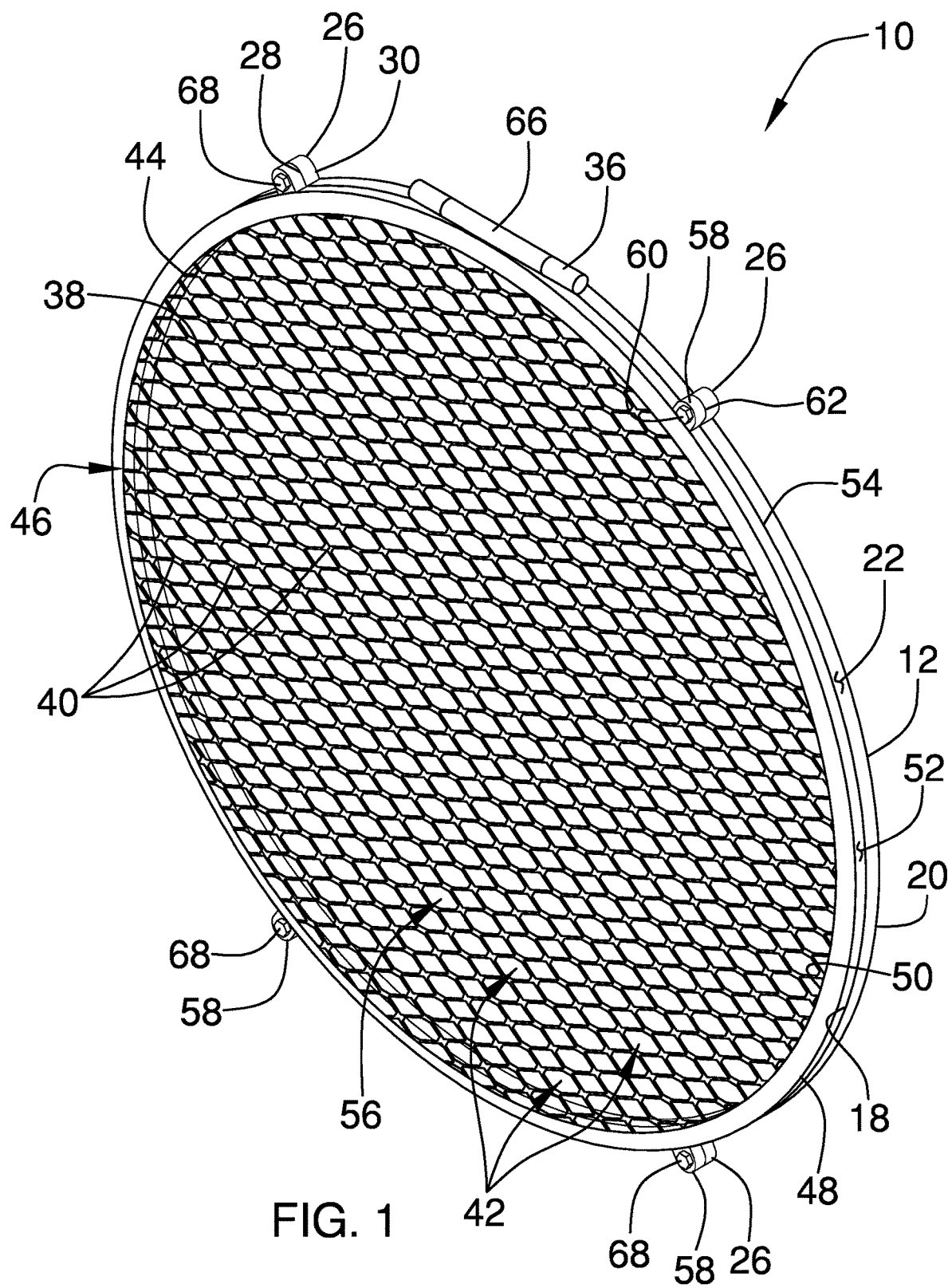
FIG. 1 is a front perspective view of a jet engine screen assembly according to an embodiment of the disclosure.
Figure 2:
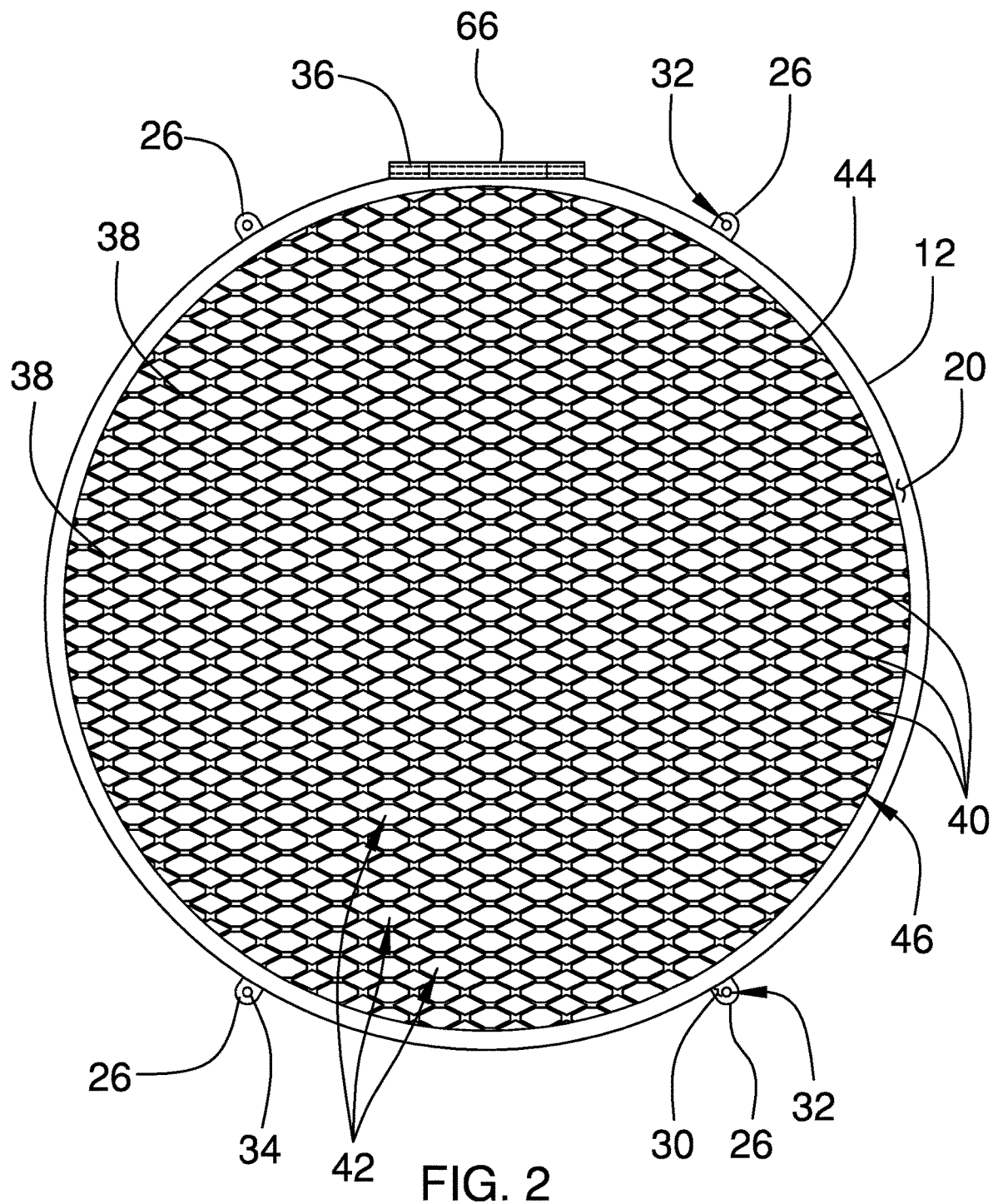
FIG. 2 is a back view of an embodiment of the disclosure.
Figure 3:
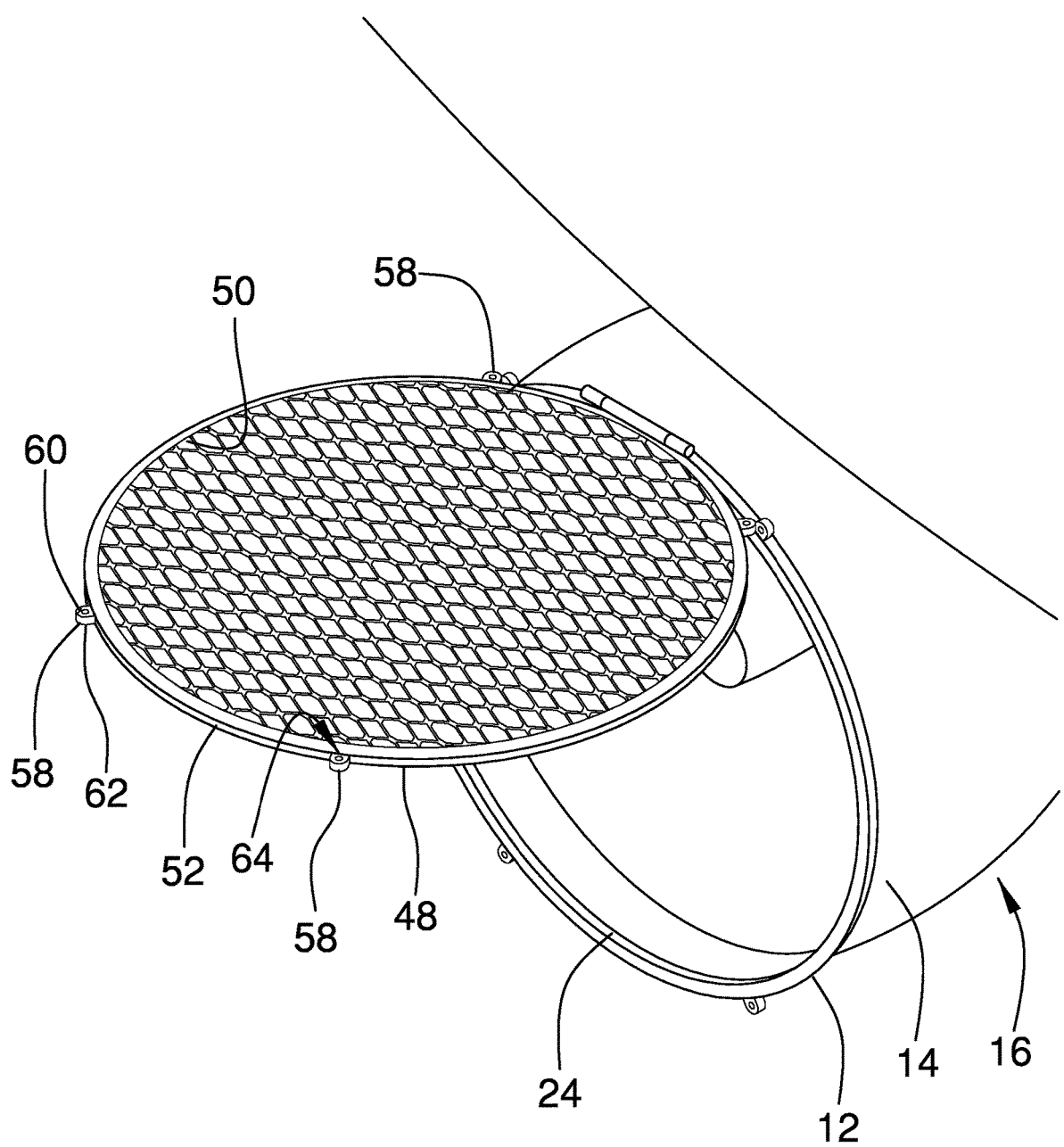
FIG. 3 is a perspective in-use view of an embodiment of the disclosure showing a grate in an opened position.
Figure 4:
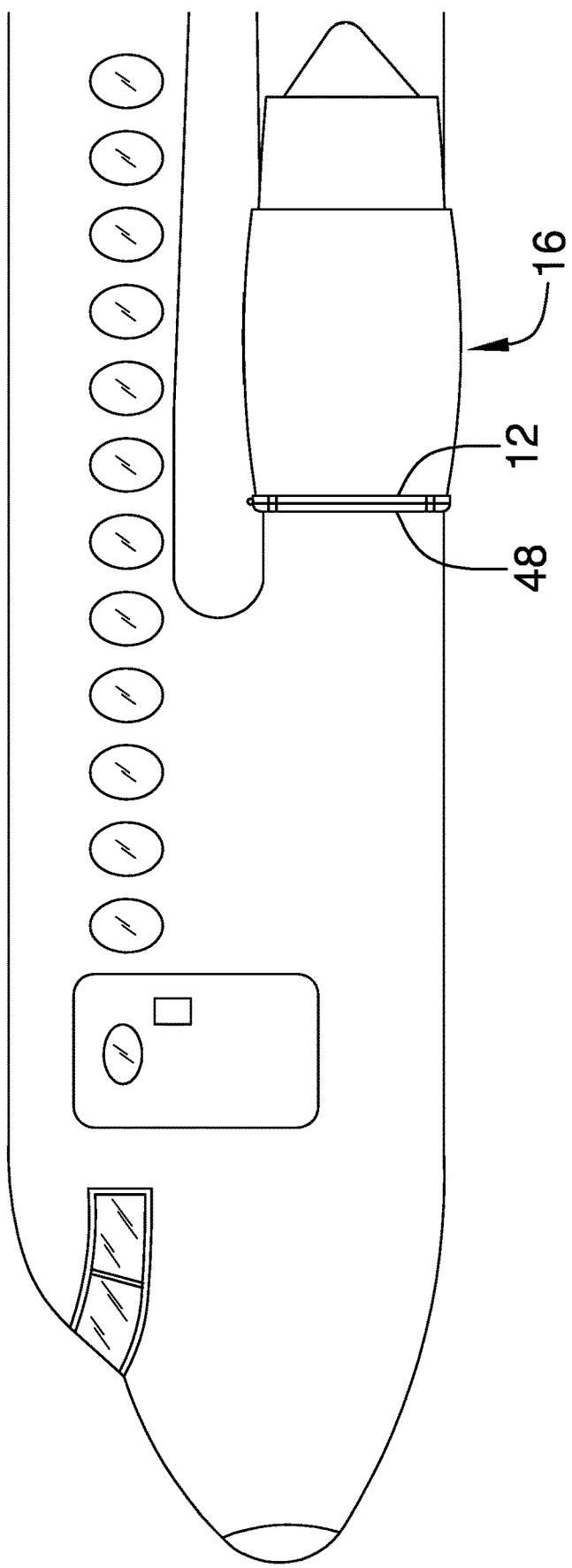
FIG. 4 is a side in-use view of an embodiment of the disclosure.

With reference now to the drawings, and in particular to FIGS. 1 through 5 thereof, a new screen device embodying the principles and concepts of an embodiment of the disclosure and generally designated by the reference numeral 10 will be described.

As best illustrated in FIGS. 1 through 5, the jet engine screen assembly 10 generally comprises a mounting ring 12 which forms a closed loop thereby facilitating the mounting ring 12 to be mounted to an intake 14 of a jet engine 16. The mounting ring 12 has a front surface 18, a back surface 20 and an outer surface 22 extending between the front surface 18 and the back surface 20. The back surface 20 is mounted to a leading edge 24 of the intake 14 of the jet engine 16 having the mounting ring 12 extending around the leading edge 24. In this way the mounting ring 12 facilitates air to flow unobstructed into the intake 14. The jet engine 16 may be a turbofan jet engine mounted to a wing of a commercial aircraft which has a circular cowling that defines the intake 14 into the jet engine 16.

A plurality of first lobes 26 is each coupled to and extends away from the mounting ring 12 and each of the first lobes 26 is positioned on and extends outwardly from the outer surface 22 of the mounting ring 12. The first lobes 26 are spaced apart from each other and are distributed around the mounting ring 12. Each of the first lobes 26 has a forward surface 28 and an rearward surface 30, and each of the first lobes 26 has a hole 32 extending through the forward surface 28 and the rearward surface 30. Additionally, the hole 32 in each of the first lobes 26 has a bounding surface 34 and the bounding surface 34 is threaded. A first hinge 36 is coupled to and extends away from the mounting ring 12 and the first hinge 36 is positioned on the outer surface 22 of the mounting ring 12. Furthermore, the first hinge 36 is centrally positioned between a respective pair of the first lobes 26.

A grate 38 is provided and the grate 38 is hingedly disposed on the mounting ring 12. The grate 38 is comprised of a plurality of intersecting members 40 is arranged to define a plurality of holes 42 to facilitate air to pass through the grate 38. Moreover, the grate 38 is comprised of a rigid material to inhibit debris from entering into the jet engine 16. The grate 38 is positionable in a closed position has the grate 38 covering the intake 14 of the jet engine 16. In this way the grate 38 inhibits a bird, for example, from entering the jet engine 16 and potentially damaging or destroying the jet engine 16. The grate 38 is positionable in an open position having the grate 38 being displaced from the intake 14 of the jet engine 16.

Each of the intersecting members 40 has a free end 44 defining an outer threshold 46 of the grate 38. A grate ring 48 is provided which forms a closed loop. The grate ring 48 has an interior surface 50, an exterior surface 52 and a rearward surface 54. The outer threshold 46 of the grate 38 is coupled to the interior surface 50 of the grate ring 48 such that the grate 38 completely covers an opening 56 defined by the grate ring 48.

A plurality of second lobes 58 is each is coupled to and extends outwardly from the exterior surface 52 of the grate ring 48. The second lobes 58 are spaced apart from each other and are distributed around the grate ring 48. Additionally, each of the second lobes 58 has a forward surface 60 and a rear surface 62. Each of the second lobes 58 has a hole 64 extending through the forward surface 60 and the rear surface 62 of the second lobes 58.

A second hinge 66 is coupled to the exterior surface 52 of the grate ring 48 and the second hinge 66 is centrally positioned between a respective pair of the second lobes 58. The second hinge 66 pivotally engages the first hinge 36. The rearward surface 30 of the grate ring 48 abuts the front surface 18 of the mounting ring 12 when the grate 38 is positioned in the closed position. Furthermore, each of the second lobes 58 is aligned with a respective one of the first lobes 26 when the grate 38 is positioned in the closed position. A plurality of bolts 68 is provided and each of the bolts 68 is extendable through the hole 64 in a respective one of the second lobes 58 when the grate 38 is positioned in the closed position. Each of the bolts 68 threadably engages the bounding surface 34 of the hole 32 in a respective one of the first lobes 26 for retaining the grate 38 in the closed position.

In use, the mounting ring 12 is attached to the leading edge 24 of the intake 14 of the jet engine 16 in a variety of different manners, depending on the best practice approved for the particular design of the jet engine 16. The grate 38 is positioned in the closed position and each of the bolts 68 is extended through the respective second lobe 58 to engage the respective first lobe 26. In this way the grate 38 is retained in the closed position to inhibit objects from passing through the intake 14 and potentially damaging or destroying the jet engine 16. Each of the bolts 68 is removed from the respective second lobe 58 and first lobe 26 to facilitate the grate 38 to be positioned in the opened position. In this way service activities can be performed on the jet engine 16 without the need to remove the mounting ring 12 from the jet engine 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A jet engine screen assembly for inhibiting foreign objects from entering a jet engine, said assembly comprising:
   a mounting ring forming a closed loop thereby facilitating said mounting ring to be mounted to an intake of a jet engine;
   a grate being hingedly disposed on said mounting ring, said grate being comprised of a plurality of intersecting members being arranged to define a plurality of holes wherein said plurality of holes are configured to facilitate air to pass through said grate, said grate being comprised of a rigid material wherein said grate is configured to inhibit debris from entering into the jet engine, said grate being positionable in a closed position having said grate covering the intake of the jet engine, said grate being positionable in an open position having said grate being displaced from the intake of the jet engine;
   wherein said mounting ring has a front surface, a back surface and an outer surface extending between said front surface and said back surface, said back surface being mounted to a leading edge of the intake of the jet engine having said mounting ring extending around the leading edge wherein said mounting ring is configured to facilitate air to flow unobstructed into the intake; and
   a plurality of first lobes, each of said first lobes being coupled to and extending away from said mounting rings, each of said first lobes is positioned on and extending outwardly from said outer surface, said first lobes being spaced apart from each other and being distributed around said mounting ring, each of said first lobes having a forward surface and an rearward surface, each of said first lobes having a hole extending through said forward surface and said rearward surface, said hole in each of said first lobes having a bounding surface, said bounding surface being threaded.

2. The assembly according to claim 1, further comprising a first hinge being coupled to and extending away from said mounting ring, said first hinge being positioned on said outer surface of said mounting ring, said first hinge being centrally positioned between a respective pair of said first lobes.

3. The assembly according to claim 1, wherein:
   each of said intersecting members of said grate has a free end defining an outer threshold of said grate; and
   said assembly includes a grate ring forming a closed loop, said grate ring having an interior surface, an exterior surface and a rearward surface, said outer threshold of said grate being coupled to said interior surface of said grate ring such that said grate completely covers an opening defined by said grate ring.

4. The assembly according to claim 3, further comprising a plurality of second lobes, each of said second lobes being coupled to and extending outwardly from said exterior surface of said grate ring, said second lobes being spaced apart from each other and being distributed around said grate ring, each of said second lobes having a forward surface and a rear surface, each of said second lobes having a hole extending through said forward surface and said rear surface of said second lobes.

5. The assembly according to claim 4, wherein:
said assembly includes a first hinge being coupled to said mounting ring; and
said assembly includes a second hinge being coupled to said exterior surface of said grate ring, said second hinge being centrally positioned between a respective pair of said second lobes, said second hinge pivotally engaging said first hinge, said rearward surface of said grate ring abutting said front surface of said mounting ring when said grate is positioned in said closed position, each of said second lobes being aligned with a respective one of said first lobes when said grate is positioned in said closed position.

6. A jet engine screen assembly for inhibiting foreign objects from entering a jet engine, said assembly comprising:
a mounting ring forming a closed loop thereby facilitating said mounting ring to be mounted to an intake of a jet engine;
a grate being hingedly disposed on said mounting ring, said grate being comprised of a plurality of intersecting members being arranged to define a plurality of holes wherein said plurality of holes are configured to facilitate air to pass through said grate, said grate being comprised of a rigid material wherein said grate is configured to inhibit debris from entering into the jet engine, said grate being positionable in a closed position having said grate covering the intake of the jet engine, said grate being positionable in an open position having said grate being displaced from the intake of the jet engine;
wherein each of said intersecting members of said grate has a free end defining an outer threshold of said grate;
wherein said assembly includes a grate ring forming a closed loop, said grate ring having an interior surface, an exterior surface and a rearward surface, said outer threshold of said grate being coupled to said interior surface of said grate ring such that said grate completely covers an opening defined by said grate ring;
a plurality of first lobes;
a plurality of second lobes, each of said second lobes being coupled to and extending outwardly from said exterior surface of said grate ring, said second lobes being spaced apart from each other and being distributed around said grate ring, each of said second lobes having a forward surface and a rear surface, each of said second lobes having a hole extending through said forward surface and said rear surface of said second lobes;
each of said first lobes has a hole extending through said first lobes, said hole in each of said first lobes having a bounding surface; and
said assembly includes a plurality of bolts, each of said bolts being extendable through said hole in a respective one of said second lobes when said grate is positioned in said closed position having each of said bolts threadably engaging said bounding surface of said hole in a respective one of said first lobes for retaining said grate in said closed position.

7. A jet engine screen assembly for inhibiting foreign objects from entering a jet engine, said assembly comprising:
a mounting ring forming a closed loop thereby facilitating said mounting ring to be mounted to an intake of a jet engine, said mounting ring having a front surface, a back surface and an outer surface extending between said front surface and said back surface, said back surface being mounted to a leading edge of the intake of the jet engine having said mounting ring extending around the leading edge wherein said mounting ring is configured to facilitate air to flow unobstructed into the intake;
a plurality of first lobes, each of said first lobes being coupled to and extending away from said mounting ring, each of said first lobes being positioned on and extending outwardly from said outer surface, said first lobes being spaced apart from each other and being distributed around said mounting ring, each of said first lobes having a forward surface and an rearward surface, each of said first lobes having a hole extending through said forward surface and said rearward surface, said hole in each of said first lobes having a bounding surface, said bounding surface being threaded;
a first hinge being coupled to and extending away from said mounting ring, said first hinge being positioned on said outer surface of said mounting ring, said first hinge being centrally positioned between a respective pair of said first lobes;
a grate being hingedly disposed on said mounting ring, said grate being comprised of a plurality of intersecting members being arranged to define a plurality of holes wherein said plurality of holes are configured to facilitate air to pass through said grate, said grate being comprised of a rigid material wherein said grate is configured to inhibit debris from entering into the jet engine, said grate being positionable in a closed position having said grate covering the intake of the jet engine, said grate being positionable in an open position having said grate being displaced from the intake of the jet engine, each of said intersecting members having a free end defining an outer threshold of said grate;
a grate ring forming a closed loop, said grate ring having an interior surface, an exterior surface and a rearward surface, said outer threshold of said grate being coupled to said interior surface of said grate ring such that said grate completely covers an opening defined by said grate ring;
a plurality of second lobes, each of said second lobes being coupled to and extending outwardly from said exterior surface of said grate ring, said second lobes being spaced apart from each other and being distributed around said grate ring, each of said second lobes having a forward surface and a rear surface, each of said second lobes having a hole extending through said forward surface and said rear surface of said second lobes;
a second hinge being coupled to said exterior surface of said grate ring, said second hinge being centrally positioned between a respective pair of said second lobes, said second hinge pivotally engaging said first hinge, said rearward surface of said grate ring abutting said front surface of said mounting ring when said grate is positioned in said closed position, each of said second lobes being aligned with a respective one of said first lobes when said grate is positioned in said closed position; and a plurality of bolts, each of said bolts being extendable through said hole in a respective one of said second lobes when said grate is positioned in said closed position having each of said bolts threadably engaging said bounding surface of said hole in a respective one of said first lobes for retaining said grate in said closed position.

\* \* \* \* \*